United States Patent [19]
Hartley et al.

[11] 3,777,890
[45] Dec. 11, 1973

[54] ROTARY DISTRIBUTORS
[75] Inventors: Michael Augustine Hartley, Newcastle; Robert Rowley, Congleton, both of England
[73] Assignee: Simon-Hartley Limited, Stoke-on-Trent, Staffordshire, England
[22] Filed: Apr. 12, 1971
[21] Appl. No.: 132,963

[30] Foreign Application Priority Data
Apr. 24, 1970 Great Britain.................. 19,944/70

[52] U.S. Cl.............................. 210/150, 210/456
[51] Int. Cl............................................. B01d 23/20
[58] Field of Search.................. 210/150, 151, 519, 210/520, 456; 261/83–85, 112

[56] References Cited
UNITED STATES PATENTS
2,364,298  12/1944  Kamp.............................. 210/150 X
2,727,785  12/1955  Kelley............................. 210/150 X
2,204,093  6/1940  Mallory.......................... 210/520 X
3,525,439  8/1970  Spragins............................. 210/520

Primary Examiner—John Adee
Attorney—Norris & Bateman

[57] ABSTRACT

A rotary distributor of the kind comprising a rotatable structure having at least one radially extending distributor arm which serves to distribute an effluent liquid onto the bed of a percolating or biological filter, characterised in that the or each distributor arm is in the form of a channel having orifices in one or both side walls thereof, said orifices being disposed at different heights whereby the number of orifices able to discharge effluent at any time is dependent upon the level of effluent in the channel and hence the rate of flow of effluent being distributed.

21 Claims, 5 Drawing Figures

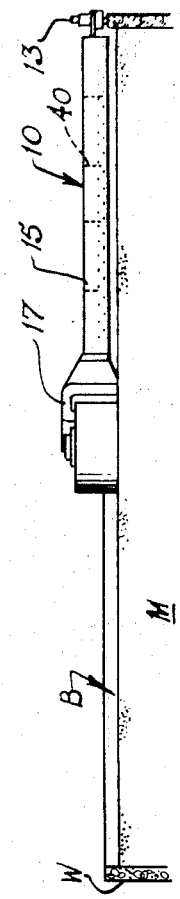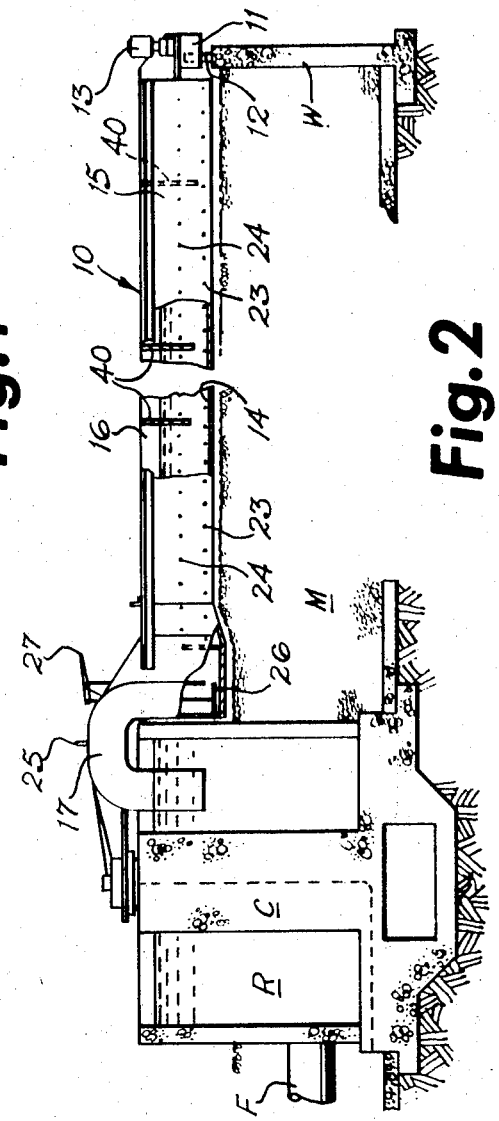

ROTARY DISTRIBUTORS

This invention concerns rotary distributors of the kind (hereinafter termed of the kind referred to) comprising a rotatable structure having at least one radially extending distributor arm which serves to distribute an effluent liquid onto the bed of a percolating or biological filter.

Rotary distributors of the kind referred to customarily have their distributor arms in the form of pipes having orifices therein through which the effluent liquid is sprayed. One problem with a distributor arm of this kind is that the total area of aperture in the arm through which the effluent escapes (which area needs to be determined by the maximum flow conditions anticipated) is constant regardless of the rate of flow of effluent liquid at any time, with the result that at low flow conditions the effluent tends to dribble onto the bed rather than to be sprayed onto the bed with the result that the distribution is uneven and in some cases leaves parts of the bed dry with a consequent deleterious effect thereon.

It is an object of the present invention to provide a rotary distributor which overcomes, at least to some extent, the disadvantage aforesaid.

According to the present invention a rotary distributor of the kind referred to is characterised in that the or each distributor arm is in the form of a channel having orifices in one or both side walls thereof, said orifices being disposed at different heights whereby the number of orifices able to discharge effluent at any time is dependent upon the level of effluent in the channel and hence the rate of flow of effluent being distributed.

The invention will be further apparent from the following description with reference to the several figures of the accompanying drawings, which show, by way of example only, one form of rotary distributor embodying the invention.

Of the drawings:

FIG. 1 shows a schematic side elevation of the rotary distributor installed on a circular percolating or biological filter;

FIG. 2 shows an enlarged cross-sectional view of the distributor in position on the filter;

Figure 3:
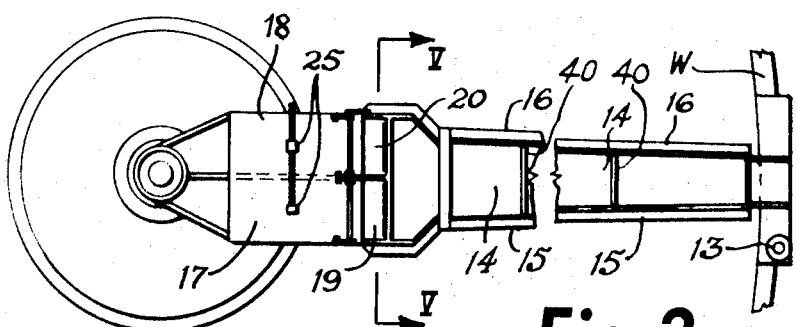
FIG. 3 shows a plan view of the rotary distributor.

Referring now to the drawings it will be seen that the rotary distributor essentially comprises in this example a single distributor arm in the form of an open topped channel generally indicated by the reference numeral 10 mounted so as to extend radially across a circular percolating or biological filter comprising an outer annular wall W which retains a bed B of filter medium M.

As best seen from FIG. 2, the arm 10 is supported for rotational movement on a column C at the centre of the filter bed B and is connected at its outer end to a carriage 11 having wheels 12 adapted to run on the coping of the annular wall W. The carriage 11 is equipped with a drive motor 13 adapted to drive the wheels 12 to progress the carriage 11 around the periphery of the wall W thereby moving the arm 10 angularly over the filter bed.

The open topped channel which comprises the arm 10 consists of a base wall 14 and opposed side walls 15 and 16. The channel is of constant height but of a width which preferably decreases gradually from the centre of the arm towards its outer end as shown in FIG. 3. The channel may be of constant width having parallel side walls if desired.

The liquid effluent to be distributed is supplied to an open topped annular well or reservoir R surrounding the column C by a feed pipe F. The liquid effluent is transferred from the reservoir R to the interior of the channel forming the arm 10 by siphonic action, two inverted U-shaped siphon tubes 17 and 18 being provided for this purpose. The inner open ends of the siphon tubes 17 and 18 are immersed in the reservoir R whilst the outer open ends terminate in tanks 19 and 20 at the root of the channel forming the arm 10. The tanks 19 and 20 are adapted to overflow into the channel, adjustable weir plates 21 and 22 being provided for this purpose.

The effluent liquid which is fed to the interior of the channel member is discharged therefrom onto the upper surface of the filter bed B by means of orifices 23 and 24 provided in one or both of the side walls 15 and 16 of the channel. The orifices 23 are disposed at spaced intervals along the lengths of the wall or walls at a position just above the base 14 of the channel member, whilst the orifices 24 are disposed at spaced intervals along the lengths of the wall or walls at a higher level. The orifices 23 are laterally offset with respect to the orifices 24, as clearly shown in FIG. 2. The spacing of the orifices and/or the areas of cross-section thereof are so selected as to ensure that the quantity of effluent distributed by unit length of the channel increases along the length of the channel from the inner end thereof, so that equal volumes of filter medium are sprayed with substantially equal volumes of effluent.

In use, with the motor 13 operative, the arm 10, together with the siphon tubes 17 and 18, is moved around the filter and effluent liquid to be distributed is transferred by siphonic action from the reservoir R through the tubes 17 and 18 to the tanks 19 and 20 from which it overflows into the channel forming the arm 10 for discharge onto the upper surface of the filter bed through the orifices 23 and 24.

When the flow rate of effluent is high the surface level of the effluent in the reservoir R is above the level of the upper edges of both of the weir plates 21 and 22 with the result that both siphon tubes 17 and 18 are operative in transferring the effluent from the reservoir R to the channel. When the effluent flow rate is low the surface level thereof in the reservoir R falls below the level of the higher weir plate 21 and the siphon tube 17 only remains operative in transferring the effluent into the channel.

It will be appreciated that by suitably selecting the sizes of the siphon tubes 17 and 18, and the heights of the weirs 21 and 22, the arrangement will be effective in transferring the effluent fed to the reservoir R without any danger of the reservoir R overflowing or emptying to break the siphonic action over a wide range of flow conditions which can be chosen to include all conditions anticipated in practice.

Likewise the numbers, sizes and heights of the orifices in the side walls of the channel 10 can be selected to ensure that the level of effluent in the channel cannot rise sufficiently to cause the channel to overflow at its upper edges. Obviously, at low flow conditions, only the lower row of orifices 23 in the channel will be operative, whilst at high flow conditions the level of effluent in the channel will rise to bring the orifices 24 additionally into operation.

Since the area of cross-section of the channel 10 is large relative to the sizes of the orifices, the head of effluent is substantially the same over the length of the channel, and the effluent is thus distributed substantially evenly across the filter bed irrespective of the flow rate. Since the total area of cross-section of aperture through which the effluent can escape from the channel 10 is reduced at low flow conditions the tendency for the effluent at such conditions to be dribbled onto the bed is reduced.

There is an increasing tendency for modern biological or percolating filters to utilise a filter medium of plastics material, which should remain wet at all times. As a consequence modern biological filters tend to operate such that the radial arms are swept over the bed at high speed. Because of these high speeds there is a tendency in such filters for the head of effluent to rise towards the outer ends of the arms on account of centrifugal action. In order to overcome this adverse effect spaced depending baffles 40 may be provided along the length of the arm 10. Each baffle 40 extends transversely across the full width of the channel and has its lower edge spaced from the base 14 of the channel to provide an aperture for the flow of effluent liquor therepast along the channel. The position of the lower edge of each baffle is selected to minimise any tendency for a head to build up along the length of the channel due to centrifugal effect at the designed operational speed. Thus the spaces between the lower edges of the baffles 40 and the base 14 of the channel decrease along the arm 10 towards its outer end.

When starting the apparatus after a period when the tubes 17 and 18 have been emptied it is necessary to prime the siphon tubes, and cocks 25 are provided on the tubes 17 and 18 to enable the connection of a priming pump for this purpose. When priming it is of course necessary to shut off the outer open ends of the siphon tubes 17 and 18 and valve plates 26 operable by a lever 27 are provided for this purpose.

Figure 4:
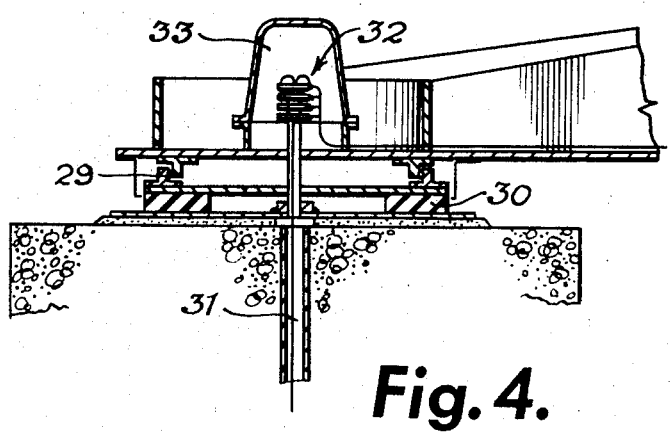
FIG. 4 shows a cross sectional detail of the mounting of the distributor on the filter.
Figure 5:
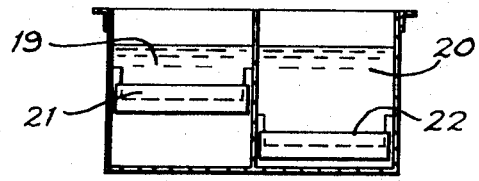
FIG. 5 shows a cross-section through the distributor arm on the line V—V of FIG. 3.

As can be seen from FIG. 4, the root of the arm 10 is mounted for rotation on a slewing ring 29 which is flexibly mounted on the head of the column C by means of a resilient mounting pad 30 of neoprene foam for example. It is necessary that the mounting is resilient to compensate for variations in the level of the coping of the wall W around the periphery of the filter on which the carriage 11 runs.

Power supplies for the motor 13 are conveniently led up through the column C as indicated at 31 and transferred along the arm 10 to the motor 13 via a slip ring assembly generally indicated at 32 disposed under a weatherproof cap 33.

It will be appreciated that it is not intended to limit the invention to the above example only, many variations, such as might readily occur to one skilled in the art, being possible, without departing from the scope thereof.

Thus, for example, the orifices provided in the side walls of the channel 10 may be disposed at more than two levels so that more evenly distributed progressive cutting-out of orifices occurs under falling flow rate conditions.

Again, for example, the distributor may comprise more than one radial arm, two or four being particularly convenient arrangements. The arms may be supported as cantilevers from a conventional central rotatable structure, there then being no contact with the peripheral wall of the filter.

Yet again, for example, the feed liquor need not be supplied by siphonic action conventional gravity or pump feeds being possible, though such have the disadvantage of requiring in known manner, sealing means between the stationary and rotating parts respectively.

If the orifices are present in both side walls of the channel they may be at one level only in each wall, the levels on the two walls of course being different.

We claim:

1. In combination with means defining the bed of a percolating or biological filter, a rotary distributor comprising a rotatable structure mounted for movement over said bed and having at least one substantially horizontally extending distributor arm which extends over the bed and is adapted to distribute an effluent liquid onto said bed, characterized in that each distributor arm is in the form of a channel providing a continuous flowpath for effluent from end to end and having orifices in at least one side wall thereof, said orifices being present in a plurality of groups thereof, there being a plurality of orifices in each group arranged at spaced intervals in a row extending over substantially the length of the channel, all of the orifices in each said group being disposed at substantially the same height above the base of the channel but at a different height above the base of the channel from the orifices in each other group, whereby the number of groups of orifices able to discharge effluent onto said bed at any time is dependent upon the level of effluent in the channel and hence the rate of flow of effluent being distributed, and the cross sectional area of said channel being relatively large as compared to sizes of said orifices whereby the head of said effluent is substantially the same over the length of said channel and effluent is distributed substantially evenly across the filter bed.

2. In the combination defined in claim 1, said orifices being so sized and so spaced that the quantity of effluent distributed by unit length of the channel increases along the length of the channel from the inner end thereof.

3. A rotary distributor according to claim 1, wherein the or each channel is open-topped.

4. A rotary distributor according to claim 1, wherein the said channel is open-topped.

5. A rotary distributor according to claim 1, wherein the said channel is of rectangular cross-section.

6. A rotary distributor according to claim 4, wherein the said channel is of rectangular cross-section.

7. A rotary distributor according to claim 1, wherein said groups of orifices are arranged in a plurality of horizontal rows at different levels in both of the side walls of each channel.

8. A rotary distributor according to claim 6, wherein said groups of orifices are arranged in a plurality of horizontal rows at different levels in both of the side walls of each channel.

9. A rotary distributor according to claim 1, wherein there are two rows of orifices in one side wall only of the or each channel.

10. A rotary distributor according to claim 9, wherein the orifices in one of said rows are laterally offset with respect to those in the other of said rows.

11. A rotary distributor according to claim 1, including a plurality of spaced baffles along the length of each channel, each said baffle extending transversely across the full width of the channel and downwardly into the cross-section thereof so as to have its lower edge spaced from the base of the channel to define therewith an aperture to permit flow of effluent along the channel, whereby to reduce variations in the head of effluent within the channel due to centrifugal forces when the distributor arm is rotating.

12. A rotary distributor according to claim 1, including a plurality of spaced baffles along the length of each channel, each said baffle extending transversely across the full width of the channel and downwardly into the cross-section thereof so as to have its lower edge spaced from the base of the channel to define therewith an aperture to permit flow of effluent along the channel, whereby to reduce variations in the head of effluent within the channel due to centrifugal forces when the distributor arm is rotating.

13. A rotary distributor according to claim 11, wherein the space between the lower edge of each baffle and the base of the channel diminishes at successive baffles along the length of the channel towards its outer end.

14. A rotary distributor according to claim 12, wherein the space between the lower edge of each baffle and the base of the channel diminishes at successive baffles along the length of the channel towards its outer end.

15. A rotary distributor according to claim 1, wherein a stationary well for effluent to be distributed is disposed at the inner end of each arm, and siphon means extending between the well and the inner end of each channel is provided for continuously supplying effluent from the well to the channel during rotation of said arm.

16. A rotary distributor according to claim 14, wherein a stationary well for effluent to be distributed is disposed at the inner end of each arm, and siphon means extending between the well and the inner end of each channel is provided for continuously supplying effluent from the well to the channel during rotation of the said arm.

17. A rotary distributor according to claim 15, said siphon means including a plurality of inverted U-shaped siphon tubes mounted for movement with each distributor arm, each said siphon tube having one of its limbs immersed in said well and the other of its limbs in a tank on said arm whose contents can overflow a weir into the interior of the associated channel, there being one such tank for each siphon tube, and the weirs of said tanks being set at different heights.

18. A rotary distributor according to claim 16, said siphon means including a plurality of inverted U-shaped siphon tubes mounted for movement with each distributor arm, each said siphon tube having one of its limbs immersed in said well and the other of its limbs in a tank on said arm whose contents can overflow a weir into the interior of the associated channel, there being one such tank for each siphon tube, and the weirs of said tanks being set at different heights.

19. A rotary distributor according to claim 17, wherein there are two siphon tubes for each distributor arm.

20. A rotary distributor according to claim 18, wherein there are two siphon tubes for each distributor arm.

21. In the combination defined in claim 10, said orifices being so sized and so spaced that the quantity of effluent distributed by unit length of the channel increases along the length of the channel from the inner end thereof.

* * * * *

UNITED STATES PATENT OFFICE
CERTIFICATE OF CORRECTION

Patent No. 3,777,890          Dated December 11, 1973

Inventor(s) M.A. Hartley et al

It is certified that error appears in the above-identified patent and that said Letters Patent are hereby corrected as shown below:

Column 1, line 48, after "cross" insert --hyphen--.

Column 4, line 27, after "each" insert --said--.

Column 6, line 8, after "of" delete --the--.

Signed and sealed this 11th day of June 1974.

(SEAL)
Attest:

EDWARD M. FLETCHER, JR.
Attesting Officer

C. MARSHALL DANN
Commissioner of Patents